's Patent [19] [11] 3,740,741
Jones [45] June 19, 1973

[54] ALARM SET POINT CONTROL SYSTEM

[75] Inventor: William H. Jones, Villa Park, Ill.

[73] Assignee: Eaton Corporation, Cleveland, Ohio

[22] Filed: May 26, 1971

[21] Appl. No.: 146,870

[52] U.S. Cl. ............ 340/272, 340/282, 340/267 C, 177/210
[51] Int. Cl. ............................................. G08c 19/00
[58] Field of Search ............... 340/272, 282, 267 C, 340/248 A, 248 B, 248 C, 267 R, 285; 235/151.33; 177/210

[56] References Cited
UNITED STATES PATENTS

| | | | |
|---|---|---|---|
| 3,618,064 | 11/1971 | Hamilton | 340/272 X |
| 2,958,823 | 11/1960 | Rabier | 340/248 A X |
| 2,858,070 | 10/1958 | Scharff | 340/267 C |
| 3,638,212 | 1/1972 | Peter et al. | 340/267 C |
| 3,617,879 | 11/1971 | Mugnier | 340/248 A X |
| 3,534,355 | 10/1970 | Fathauer | 340/282 X |

Primary Examiner—John W. Caldwell
Assistant Examiner—Scott F. Partridge
Attorney—Hill, Sherman, Meroni, Gross & Simpson

[57] ABSTRACT

A preset amount of weight change with respect to a load cell is monitored by a circuit which provides an alarm at an adjustable point prior to the weight change reaching the predetermined amount. A load cell and a phase detector circuit are driven by an oscillator which provides a pair of different phase signals. The phase detector is further provided with an output signal from the load cell indicative of the weight carried by the load cell and at the frequency and phase of one of the signals of the oscillator. The phase detector provides a direct current signal representative of weight carried on the load cell in response to its input alternating signals and the direct current signal is utilized for determining operation of an alarm device. An adjustable and switchable set point circuit is provided for developing an operating signal for the alarm device in response to the direct current signal from the phase detector, the switching function being effective to permit the direct current signal to approach a reference signal representative of the predetermined weight change unidirectionally regardless of whether the load cell is being loaded or unloaded.

4 Claims, 2 Drawing Figures

PATENTED JUN 19 1973
3,740,741
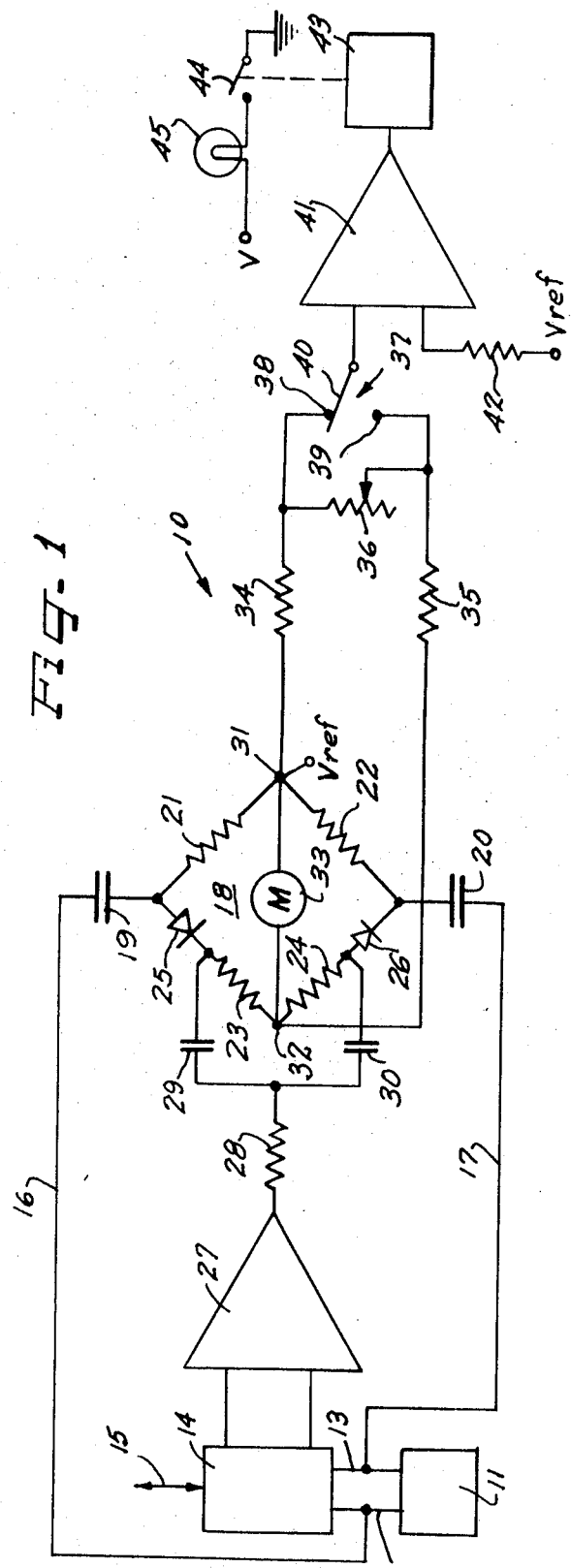
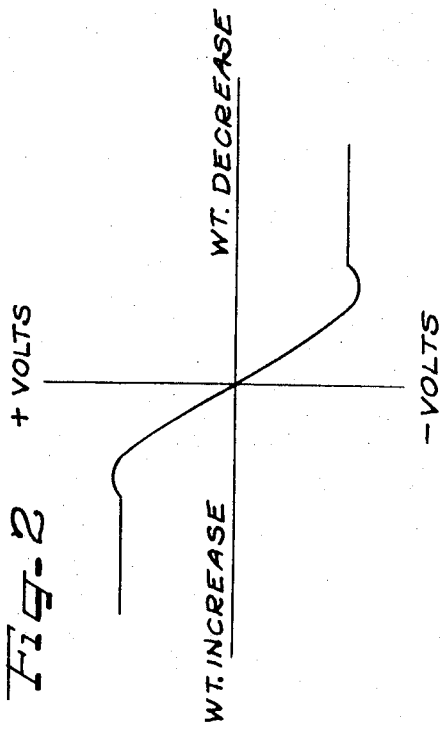
INVENTOR.
William H. Jones
BY Hill, Sherman, Meroni, Gross & Simpson
ATTORNEYS 3,740,741

ALARM SET POINT CONTROL SYSTEM

BACKGROUND OF THE INVENTION

1. Field of the Invention

This invention relates to load cell measuring circuits and in particular to circuits for providing an alarm upon detection of a predetermined change of weight at a load cell, the alarm function being adjustable to provide an early warning prior to weight change of a predetermined amount at the load cell.

2. Description of the Prior Art

It is well known in the prior art to provide an oscillator to drive a load cell and a phase detector with output signals of different phases wherein the load cell in turn provides an output signal of the same frequency and phase as one of the phases provided by the oscillator. This output signal is representative of weight on the load cell and is also fed to the phase detector for providing a direct current signal representative of weight carried by the load cell.

The direct current signal is utilized as an input to a differential amplifier having a referenced input representative of a predetermined amount of weight change at the load cell. The differential amplifier therefore functions to trigger an alarm device when the desired amount of weight change has occurred. Such circuits have found particular advantage in the farming industry wherein a measured amount of feed is to be distributed along an elongate feeding zone by an operator of a truck. When the desired amount of feed has been dispensed, an alarm is set off, usually in the form of energization of the truck running lights which are clearly visible to the truck driver in that this job usually requires the driver to project his head outside of the truck cab, rather than by energization of buzzers or horns, in order to prevent frightening of farm animals.

In loading a truck for dispensing the desired amount of feed, it is also advantageous to provide an alarm which is triggered upon receipt of the desired amount of feed. It has heretofore been the practice to utilize a complex resistor network in combination with a double pole - double throw switch to invert the input to the differential amplifier. This system, while adequate in most respects, requires several components and increases production costs. In addition, it is also highly advantageous to not only provide an alarm at the desired moment of loading or unloading a desired amount, but to selectively provide the alarm prior to the desired amount of weight change in order to prevent excess loading or unnecessary driving after unloading.

It is therefore the primary object of the present invention to provide an alarm set point control system whereby an alarm is provided upon loading or unloading a desired amount of weight at a load cell, with the attendant object to provide selective setting of the operation of an alarm device so as to provide an early warning prior to complete loading or unloading of a predetermined amount of weight at a load cell.

SUMMARY OF THE INVENTION

The foregoing objectives of the invention are realized by the provision of an oscillator which is operable to provide a pair of output signals of different phase for driving a load cell and a phase detector. The load cell is responsive to the weight thereon to provide a signal indicative of the weight, which signal is of the same phase and frequency as one of the signals supplied thereto by the oscillator. The phase detector is operable in response to the signals provided thereto by the oscillator and the load cell to produce a dc signal representative of weight carried by the load cell across its output terminals. A differential amplifier is provided for driving a relay to operate desired alarm devices. The differential amplifier includes one input which is connected to a reference voltage representative of the desired amount of weight change at the load device, and a second input for receiving the dc signal, or a portion thereof, produced by the phase detector. A set point circuit is provided for connecting the output of the phase detector to the second input of the differential amplifier and comprises a pair of equal value resistors which are serially connected between respective output terminals of the phase detector and respective fixed contacts of a transfer switch which has its movable contact connected to the second input of the differential amplifier. A variable resistor is connected across the junctions of the equal value resistors and their respective switch contacts for providing a voltage adjustment so that an early warning alarm may be provided at a desired point prior to a change of weight at the load device equal to that represented by the reference voltage connected to the first input of the differential amplifier.

BRIEF DESCRIPTION OF THE DRAWING

The foregoing and other objects, features and advantages of the invention, its organization, construction and operation will best be understood from the following detailed description of an exemplary embodiment of the invention taken in conjunction with the accompanying drawings, in which:

FIG. 1 is a schematic circuit diagram of a weight monitoring system including alarm set point apparatus constructed in accordance with the principles of the present invention; and FIG. 2 is a graphical illustration of the operation of the circuit illustrated in FIG. 1.

DESCRIPTION OF THE PREFERRED EMBODIMENT

Referring to FIG. 1, there is illustrated a weight monitoring system which includes the alarm set point apparatus of the present invention. The monitoring circuit is generally referenced 10 and comprises an oscillator 11 having a pair of output terminals 12 and 13 and operable to provide output signals of respective first and second phases to these terminals. The oscillator may, for example, provide 2500 Hz signals which are substantially 180° out of phase. The output terminals 12 and 13 are connected to a load cell 14 of a type which is well known in the art and operable to provide an output signal of the same frequency and phase as, for example, that signal supplied at terminal 12 and in accordance with the weight carried by the load cell, which weight is symbolically illustrated by the double headed arrow 15.

The output terminals 12 and 13 of the oscillator 11 are respectively connected by way of a pair of conductors 16 and 17 to input terminals of a phase detector 18. The phase detector 18 includes a pair of input coupling capacitors 19 and 20, a plurality of resistors 21–24 and a pair of diodes 25 and 26. The phase detector 18 is provided with a second input from the load cell 14 by way of an amplifier 27, a resistor 28 and a pair of capacitors 29 and 30 which are connected to the junctions of the diode 25 and the resistor 23 and the diode 26 and the resistor 24.

The apparatus just described is well known and has found extensive application in the art of weight monitoring. During operation, the load cell 14 produces an output signal representative of the weight carried by the load cell and at the frequency and phase of the signal provided at the output terminal 12 of the oscillator 11. This weight indicative signal is processed through the amplifier 27 and the resistor 28 and coupled to the phase detector by way of the capacitors 29 and 30 in order that the phase detector be effective to derive a direct current voltage across a pair of output terminals 31 and 32 which is indicative of the weight carried by the load cell. As material is loaded or unloaded from the load cell, this direct current signal will, of course, change accordingly as well known.

The phase detector 18 has connected across its output terminals 31 and 32 a meter 33 which functions as a null indicator. This meter may be any form of meter which may be used to indicate a zero output signal and operates to show a null condition when the voltage thereacross is equal to a reference voltage Vref, this voltage being applied at the terminal 31.

A pair of impedance circuits are connected between the output terminals 31, 32 and an input of a differential amplifier 41. These impedance circuits respectively include equal value resistors 34 and 35 which are selectively connectible to the input of the differential amplifier 41 by way of a switch 37 which has a fixed contact 38 connected to the resistor 34, a fixed contact 39 connected to the resistor 35 and a movable contact 40 connected to an input of the amplifier 41. The amplifier 41 includes a second input which is connected by way of a resistor 42 to the reference voltage Vref. With the circuitry discussed to this point, it is clearly evident that with equal value impedances connected between the output terminals of the phase detector and the input of the amplifier, and assuming for the moment that the yet to be discussed resistor 36 is set at zero, as a null is reached in response to weight change (15) at the load cell 14, the differential amplifier 41 will be operated to energize a relay 43 and close the associated contact 44 to energize a signal lamp 45, or other alarm device. The lamp 45 symbolically illustrates the running lights of a truck or other suitable visual or audible alarm. Therefore, if the reference voltage is selected to represent a predetermined weight change, the alarm will be provided upon the occurrence of such a weight change. Assuming that the value of the resistor 34 equals the value of the resistor 35 and that the resistor 36 is set at zero, regardless of the switch position, the relay 43 will be operated at meter balance.

In the case where the resistor 36 is set at greater than zero, the switch position becomes important. Remembering that the relay 43 is operated in response to a Vref balance, it can now be expected that the alarm will occur when the voltage at the upper terminal of the resistor 36 is equal to the potential Vref. This occurs when the input voltage, that is the dc output of the phase detector 18, divided by the equivalent resistance of the set point circuit, i.e., the value of the resistor 34 over the sum of the values of the resistors 34–36, is equal to the potential Vref. Inasmuch as the values of the resistors 34 and 35 are equal, the identical "early" alarm setting may be obtained when the switch is transferred to the opposite position. A typical plot of the output voltage of the phase detector 18 with respect to the weight offset from balance is illustrated in FIG. 2, wherein the balance on the meter occurs at the crossing of the axes. It can therefore be seen in FIG. 2 that for any given amount of resistance value for the resistor 36, the alarm balance point may be moved up or down the curve by an equal amount so that the potential Vref may be applied to the movable contact 40 and the associated input to the amplifier 41 regardless of whether the load cell 14 is being loaded or unloaded.

The foregoing has therefore disclosed apparatus for providing an adjustable alarm set point for a weight monitoring system in which means are provided for producing an early warning alarm prior to reaching a complete desired weight change whether a load is being received or dispensed at a load cell.

Although I have disclosed my invention by reference to a specific illustrative embodiment thereof, many changes and modifications may become apparent to those skilled in the art and made in my invention without departing from the spirit and scope thereof, and it is to be understood that I intend to include within the patent warranted hereon all such changes and modifications as may reasonably and properly be included within the scope of my contribution to the art.

What I claim is:

1. In a weighing system of the type wherein a detector circuit provides a signal across its output terminals which is indicative of a predetermined weight being applied on an associated load cell and a set point circuit is interposed between the detector and an alarm device for establishing a signal which will effect operation of the alarm device, the improvement wherein said set point circuit comprises a differential amplifier for operating said alarm device including a first input connected to a reference potential and a second input for receiving an input signal, a pair of interconnected impedance circuits connected to the output terminals of the detector circuit for developing said input signal, and switch means operable to selectively connect said impedance circuits to said second input of said differential amplifier so that said input signal may unidirectionally approach the reference potential to effect operation of the alarm device prior to said predetermined weight being applied to said load cell regardless of whether the weight on the load cell is increasing or decreasing.

2. The improvement set forth in claim 1, wherein said impedance circuits are of equal value, and including a variable impedance connected between said impedance circuits for varying with respect to the output signal of the detector the point of development of an input signal equivalent of said reference level to provide an early warning alarm for an operator.

3. The improvement set forth in claim 2, wherein each of said impedance circuits comprises a resistor connected in series between a respective output terminal of the detector and said switch means, and comprising a variable resistor connected across the connection of said impedance circuit resistors to said switch means.

4. The improvement set forth in claim 3, wherein said switch means is a manually operable transfer switch having a movable contact connected to said second input of said differential amplifier and a pair of stationary contacts connected to said variable resistor and individually connected to said impedance circuit resistors.

* * * * *